US008433316B2

(12) United States Patent
Umatt et al.

(10) Patent No.: US 8,433,316 B2
(45) Date of Patent: Apr. 30, 2013

(54) EFFICIENT SEARCH FOR WIRELESS NETWORKS IN CONNECTED MODE

(75) Inventors: Bhupesh Manoharlal Umatt, San Diego, CA (US); Vineet Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 11/556,598

(22) Filed: Nov. 3, 2006

(65) Prior Publication Data

US 2008/0108346 A1    May 8, 2008

(51) Int. Cl.
*H04Q 7/20* (2006.01)
(52) U.S. Cl.
USPC ............... 455/434; 370/331; 370/328
(58) Field of Classification Search ............ 455/434, 455/435.1, 574
See application file for complete search history.

(56) References Cited

U.S. PATENT DOCUMENTS

| | | | | |
|---|---|---|---|---|
| 6,119,003 | A * | 9/2000 | Kukkohovi | 455/435.2 |
| 2001/0009853 | A1 | 7/2001 | Arimitsu | |
| 2002/0111180 | A1 | 8/2002 | Hogan et al. | |
| 2005/0153692 | A1 | 7/2005 | Hwang et al. | |
| 2005/0250529 | A1* | 11/2005 | Funnell et al. | 455/525 |
| 2006/0068782 | A1* | 3/2006 | Kuriyama | 455/434 |
| 2007/0149191 | A1* | 6/2007 | Wu | 455/434 |
| 2007/0270140 | A1* | 11/2007 | Islam et al. | 455/423 |
| 2008/0057948 | A1* | 3/2008 | Mittal et al. | 455/426.1 |

FOREIGN PATENT DOCUMENTS

| | | |
|---|---|---|
| CN | 1774941 A | 5/2006 |
| EP | 1313336 | 5/2003 |
| EP | 1545146 | 6/2005 |
| EP | 1802158 | 6/2007 |
| JP | 2001197538 A | 7/2001 |
| KR | 20050061250 A | 6/2005 |
| WO | WO2004102926 A2 | 11/2004 |
| WO | WO2005114860 A1 | 12/2005 |

OTHER PUBLICATIONS

Written Opinion—PCT/US07/083561—International Search Authority, European Patent Office—Aug. 22, 2007.

(Continued)

*Primary Examiner* — George Eng
*Assistant Examiner* — Joseph Dean, Jr.
(74) *Attorney, Agent, or Firm* — Kevin T. Cheatham (57) ABSTRACT

Techniques for searching for wireless networks are described. In one scheme, a user equipment (UE) performs a manual search for detectable wireless networks while operating in a connected mode. The UE operates in the connected mode for communication with a wireless network and receives a request to search for detectable wireless networks. The UE performs a search for detectable wireless networks while operating in the connected mode, e.g., as background task during DRX time. In another scheme, the UE retains a search request received in an active state and performs a search at a later time after transitioning to an idle state. In yet another scheme, the UE efficiently handles a search across state transitions. The UE may cancel, suspend, resume, or continue the search after each transition from one state to another state based on the type of each state.

31 Claims, 6 Drawing Sheets

OTHER PUBLICATIONS

International Search Report—PCT/US07/083561—International Search Authority, European Patent Office—Aug. 22, 2007.
"Universal Mobile Telecommunications System (UMTS); Radio Resource Control (RRC) protocol specification (3GPP TS 25.331 version 5.15.0 Release 5): ETSI TS 125 331," ETSI Standards, European Telecommunications Standards Institute, Sophia-Antipo, vol, 3-R2, No. V5150, Dec. 2005.

Anderson, N. et al., "Draft Report," 3GPP TSG SA Workshop on UE in Idle Mode, Feb. 7, 2001, XP002472649, Retrieved from the Internet: URL: www.3gpp.org [retrieved on Mar. 13, 2008].
Translation of Office Action in Korean application 10-2009-7011480 corresponding to US Appl. No. 11/556,598, citing KR20050061250 and US20050250529 dated Jan. 20, 2011.
Taiwan Search Report—TW096141747—TIPO—Jul. 21, 2011.

* cited by examiner

EFFICIENT SEARCH FOR WIRELESS NETWORKS IN CONNECTED MODE

BACKGROUND

I. Field

The present disclosure relates generally to communication, and more specifically to techniques for searching for wireless communication networks.

II. Background

Wireless communication networks are widely deployed to provide various communication services such as voice, packet data, broadcast, messaging, and so on. These wireless networks may be capable of supporting communication for multiple users by sharing the available network resources. Examples of such wireless networks include Code Division Multiple Access (CDMA) networks, Time Division Multiple Access (TDMA) networks, Frequency Division Multiple Access (FDMA) networks, and Orthogonal FDMA (OFDMA) networks. These wireless networks may also utilize various radio technologies such as Wideband-CDMA (W-CDMA), cdma2000, and Global System for Mobile Communications (GSM), which are known in the art.

A wireless device (e.g., a cellular phone) may be capable of communicating with different wireless networks. The wireless device may perform a search to find wireless networks from which the device can obtain service. The search may be triggered when (a) the wireless device is not in service, e.g., at power on, (b) the wireless device is currently communicating with a wireless network that is not the highest priority wireless network, or (c) a user wants to obtain a list of detectable/available wireless networks. It is desirable to perform the search as efficiently as possible so that the wireless device can obtain service from a suitable wireless network, pending communication (if any) is not interrupted, and good user experience is achieved for the user.

There is therefore a need in the art for techniques to efficiently search for wireless networks.

SUMMARY

Techniques for searching for wireless networks are described herein. These techniques may be used for various wireless networks such as Universal Mobile Telecommunication System (UMTS) networks that utilize W-CDMA, GSM networks, etc.

In one aspect, a user equipment (UE) (e.g., a cellular phone) performs a manual search for detectable wireless networks while operating in a connected mode. The UE operates in the connected mode for communication with a wireless network, e.g., a UMTS network. The UE receives a request to search for wireless networks detectable by the UE. The UE performs a search for detectable wireless networks while operating in the connected mode, e.g., as background task during discontinuous reception (DRX) time.

In another aspect, the UE retains a search request in an active state and performs a search at a later time. The UE operates in an active state of the connected mode, e.g., a CELL_DCH state or a CELL_FACH state in UMTS. The UE receives a request to search for wireless networks and retains the request while operating in the active state. The UE performs a search for wireless networks after transitioning from the active state to an idle state, e.g., a CELL_PCH state, a URA_PCH state, or an Idle mode in UMTS.

In yet another aspect, the UE efficiently handles a search across state transitions. The UE operates in a first state and receives a request to search for wireless networks. The UE thereafter transitions from the first state to a second state. The UE performs a search for wireless networks in the first state, or the second state, or both the first and second states based on the type of each state. The UE may perform the search in the first state if it is an idle state and may continue the search in the second state if it is another idle state. The UE may perform the search in the first state if it is an idle state and may suspend or cancel the search in the second state if it is an active state. The UE may delay the search in the first state if it is an active state and may perform the search in the second state if it is an idle state.

Various aspects and features of the disclosure are described in further detail below.

DETAILED DESCRIPTION

The search techniques described herein may be used for various wireless communication networks such as UMTS networks, GSM networks, cdma2000 networks, etc. The terms "network" and "system" are often used interchangeably. A GSM network utilizes GSM for air interface and Mobile Application Part (MAP) for core network. A GSM network may also implement General Packet Radio Service (GPRS) or Enhanced Data rates for Global Evolution (EDGE) for packet data. A UMTS network utilizes W-CDMA for air interface and MAP for core network. The terms "air interface", "radio technology" and "radio access technology" are used interchangeably. The terms "W-CDMA" and "UMTS" are also used interchangeably. W-CDMA and GSM are described in documents from an organization named "3rd Generation Partnership Project" (3GPP). cdma2000 is described in documents from an organization named "3rd Generation Partnership Project 2" (3GPP2).

In general, a wireless network may utilize any radio technology such as W-CDMA, GSM, cdma2000, etc. A network operator/service provider may deploy one or more wireless networks of one or more radio technologies. For clarity, the search techniques are described below for UMTS and GSM. For clarity, UMTS terminology is used in much of the description below.

Figure 1:
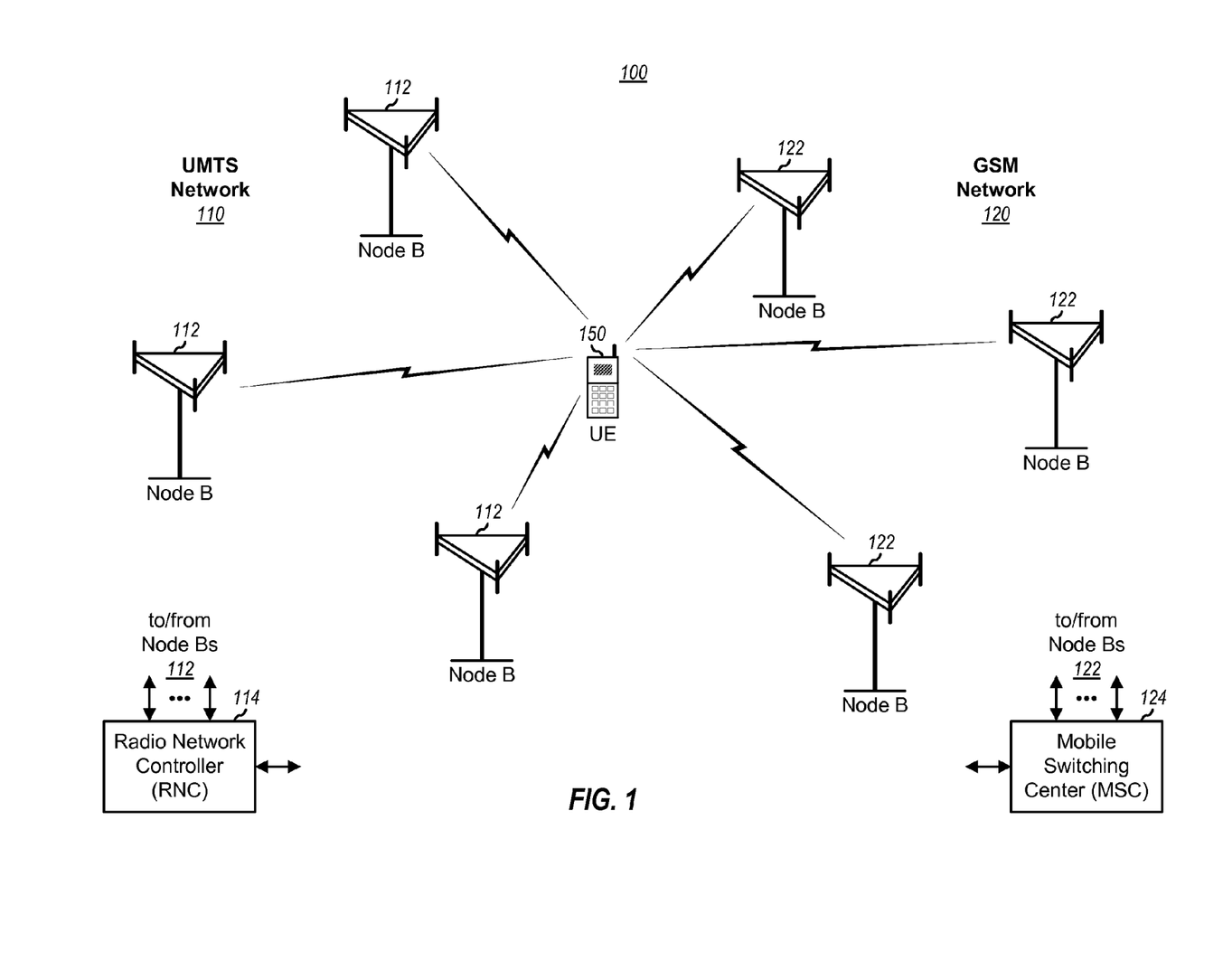
FIG. 1 shows a deployment with a UMTS network and a GSM network.

FIG. 1 shows a deployment 100 that includes a UMTS network 110 and a GSM network 120. UMTS network 110 includes Node Bs 112 that communicate with UEs within the coverage area of the UMTS network. A radio network controller (RNC) 114 couples to Node Bs 112 and provides coordination and control for these Node Bs. GSM network 120 includes Node Bs 122 that communicate with UEs within the coverage area of the GSM network. A mobile switching center (MSC) 124 couples to Node Bs 122 and provides coordination and control for these Node Bs. RNC 114 may communicate with MSC 124 to support inter-working between the UMTS and GSM networks. In general, a Node B is a fixed station that communicates with the UEs and may also be called a base station, a base transceiver station (BTS), an enhanced Node B (eNode B), an access point, etc. A wireless network typically includes many cells, where the term "cell" can refer to a Node B or the coverage area of the Node B, depending on the context in which the term is used.

A UE 150 may be capable of communicating with just UMTS network 110, or just GSM network 120, or both UMTS network 110 and GSM network 120. UE 150 may also be capable of communicating with other wireless networks, e.g., a cdma2000 network. UE 150 may be stationary or mobile and may also be called a mobile station (MS), a mobile equipment (ME), a terminal, a station (STA), etc. UE 150 may be a cellular phone, a personal digital assistant (PDA), a wireless modem, a wireless communication device, a subscriber unit, etc. UE 110 may communicate with one or more Node Bs on the downlink and/or uplink at any given moment. The downlink (or forward link) refers to the communication link from the Node Bs to the UEs, and the uplink (or reverse link) refers to the communication link from the UEs to the Node Bs.

UMTS network 110 and GSM network 120 may belong in the same or different public land mobile networks (PLMNs). A PLMN may comprise one or more wireless networks, e.g., one or more UMTS networks and/or one or more GSM networks. A PLMN is uniquely identified by a specific Mobile Country Code (MCC) and a specific Mobile Network Code (MNC). The UMTS networks and GSM networks for a given PLMN may have overlapping or non-overlapping coverage areas. Multiple PLMNs may also be deployed by different service providers in a given geographic area.

UE 150 may be provisioned with a list of preferred PLMNs from which the UE may receive service. This preferred list may be provisioned by a service provider with which the UE has a subscription. The preferred list normally includes a home PLMN (HPLMN) and other PLMNs for which the service provider has roaming agreements. The preferred list may be stored in a Subscriber Identity Module (SIM), a Universal SIM (USIM), or some other non-volatile memory module. The UE may also maintain a list of PLMNs that the UE has found during prior searches. This list of found PLMNs may be stored in an acquisition database in a non-volatile memory.

Figure 2:
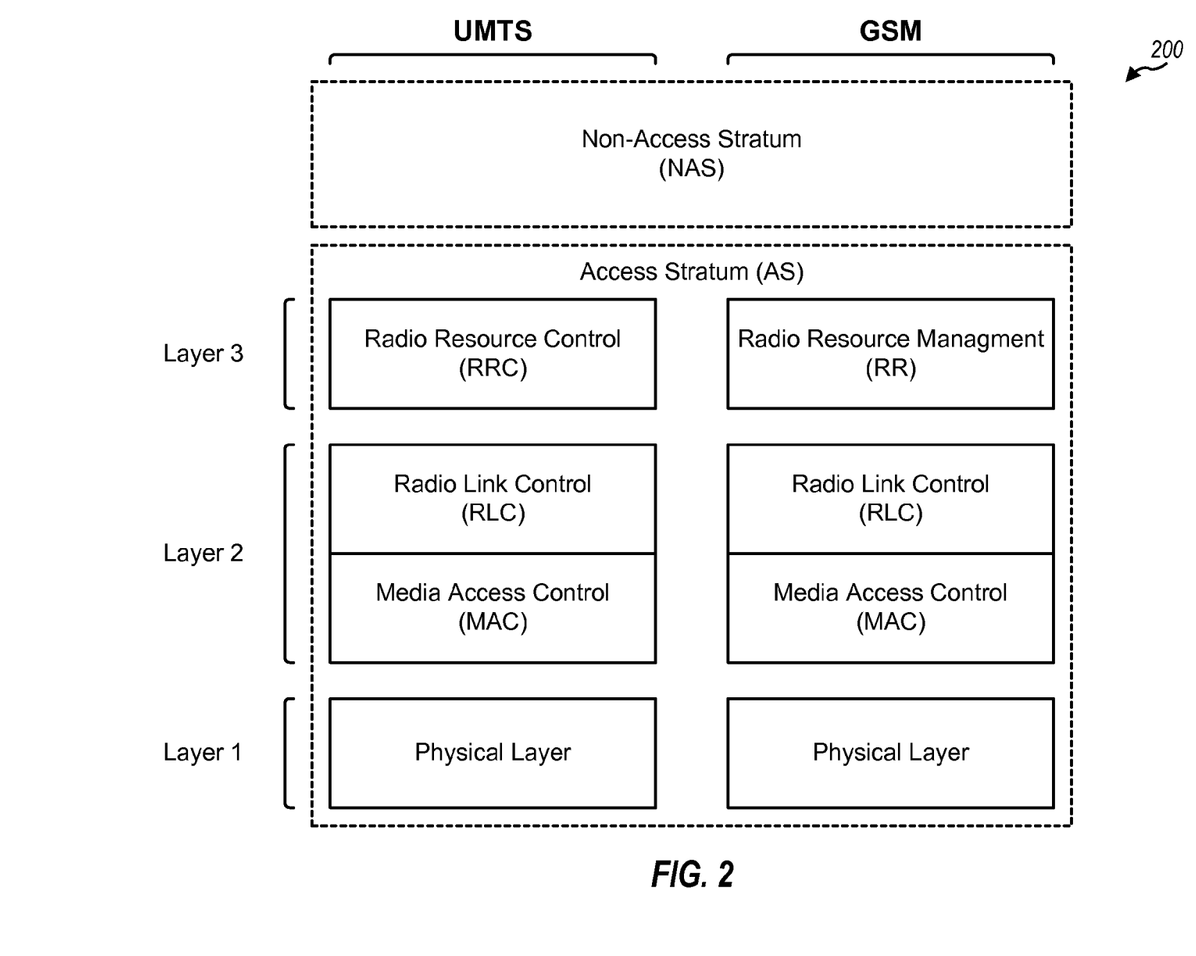
FIG. 2 shows a protocol stack for UMTS and GSM.

FIG. 2 shows a protocol stack 200 for UMTS and GSM. The protocol stack for UMTS includes a Non Access Stratum (NAS) and an Access Stratum (AS). The NAS comprises functions and protocols that support traffic and signaling between a UE and a core network with which a UMTS network interfaces. The AS comprises functions and protocols that support communication between the UE and an RNC within the UMTS network. For UMTS, the AS includes a Radio Resource Control (RRC) layer, a Radio Link Control (RLC) layer, a Medium Access Control (MAC) layer, and a physical layer. The RRC is a sublayer of Layer 3. The RLC and MAC are sublayers of Layer 2, which is also called a data link layer. The physical layer is also referred to as Layer 1.

GSM similarly includes the NAS and AS. For GSM, the AS includes a Radio Resource (RR) management layer at Layer 3, RLC and MAC layers at Layer 2, and a physical layer at Layer 1.

The RRC and RR perform various functions to search for PLMNs, to establish, maintain and terminate calls, and so on. For simplicity, only functions related to PLMN searches are described below.

Figure 3:
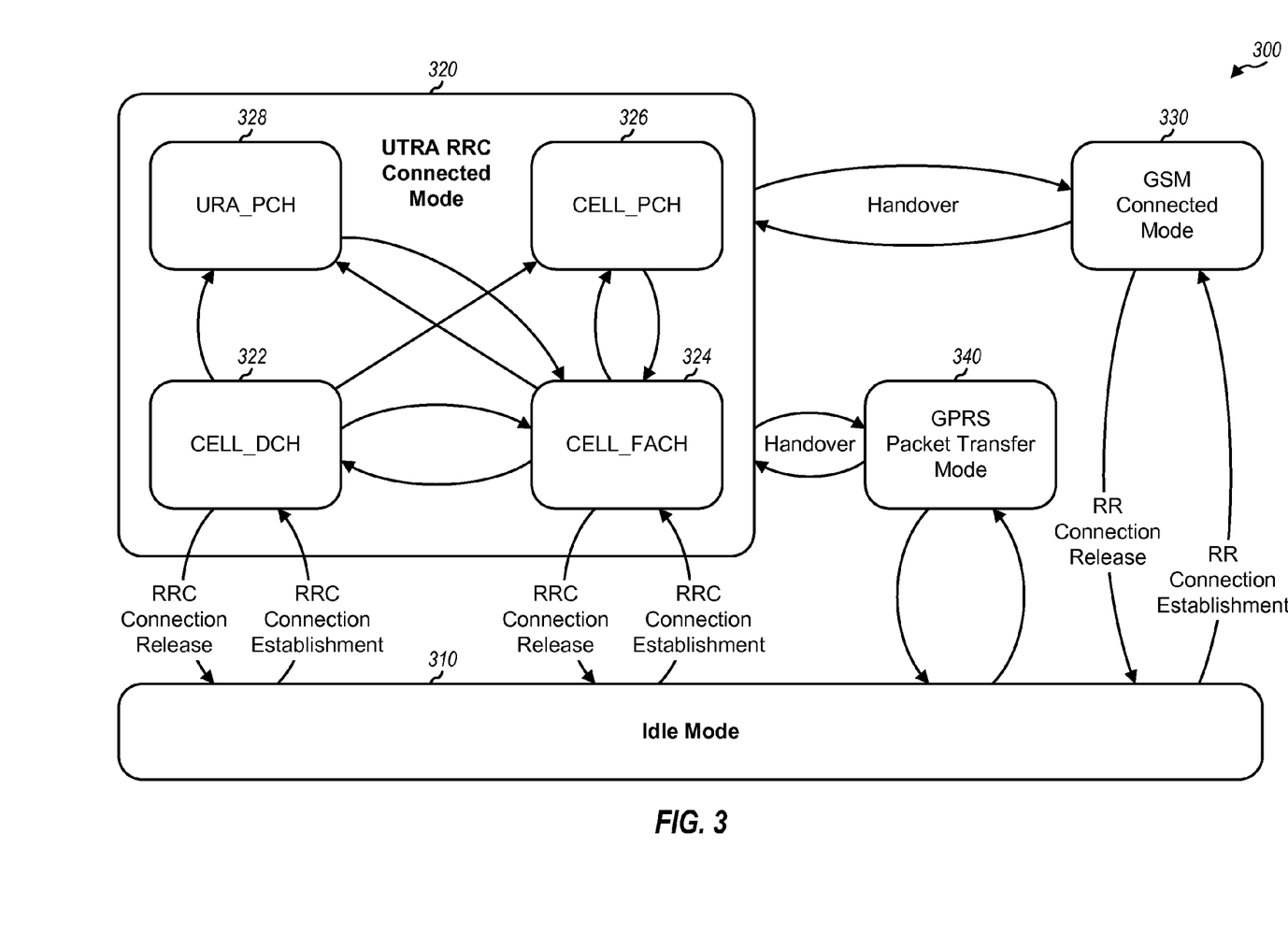
FIG. 3 shows a state diagram of states and modes in UMTS and GSM.

FIG. 3 shows a state diagram 300 of various states and modes in UMTS and GSM. For simplicity, state diagram 300 only shows pertinent states and modes, and not all possible states and modes. Upon being powered on, the UE performs cell selection to find a suitable cell from which to receive service. This cell is referred to as the serving cell. The UE may then transition to an Idle mode 310, a UMTS Terrestrial Radio Access (UTRA) RRC connected mode 320, a GSM connected mode 330, or a GPRS packet transfer mode 340 depending on whether there is any activity for the UE and whether the UE is communicating with a UMTS network or a GSM network. In the Idle mode, the UE has registered with the UMTS or GSM network, is listening for paging messages, and updates its location with the UMTS or GSM network when necessary. The UE can receive and/or transmit data with the UMTS network while in the UTRA RRC connected mode, depending on its RRC state and configuration. The UE can receive and/or transmit data with the GSM network while in the GSM connected mode or the GPRS packet transfer mode. The UE may transition between the UTRA RRC connected mode and either the GSM connected mode or the GPRS packet transfer mode for a handover between UMTS and GSM.

While in the UTRA RRC connected mode, the UE may be in one of four possible RRC states: a CELL_DCH state 322, a CELL_FACH state 324, a CELL_PCH state 326, or a URA_PCH state 328, where DCH denotes dedicated transport channel, FACH denotes forward access channel, PCH denotes paging channel, and URA denotes UTRAN registration area. Table 1 provides short descriptions for the four RRC states. The RRC states and modes are described in 3GPP TS 25.331, entitled "Radio Resource Control (RRC); Protocol Specification," Release 7, June 2006, which is publicly available.

TABLE 1

| State | Description |
|---|---|
| CELL_DCH | The UE can communicate with the UMTS network for a voice or data call via dedicated physical channels allocated to the UE. |
| CELL_FACH | The UE can exchange signaling and low rate data with the UMTS network via common channels that are shared with other UEs. |
| CELL_PCH & URA_PCH | The UE periodically monitors the PCH for paging messages and is not permitted to transmit on the uplink. |

In the CELL_PCH state, the UMTS network knows the location of the UE at the cell level. The UE performs cell update with the UMTS network whenever the UE moves to a new cell. In the URA_PCH state, the UMTS network knows the location of the UE at the URA level, where a URA is a collection of cells. The UE performs URA update with the UMTS network whenever the UE moves to a new URA. The UE may update its location more frequently in the CELL_PCH state than the URA_PCH state.

The UE may transition (1) from the Idle mode to the CELL_DCH state or CELL_FACH state by performing an RRC Connection Establishment procedure and (2) from the CELL_DCH state or CELL_FACH state to the Idle mode by performing an RRC Connection Release procedure. The UE may transition (1) from the CELL_DCH state or CELL_FACH state to another state in the UTRA RRC connected mode by performing a reconfiguration procedure and (2) between different configurations in the CELL_DCH state by also performing a reconfiguration procedure. The UMTS network may command the UE to be in one of the four RRC states in the UTRA RRC connected mode based on activity of the UE. The connection and reconfiguration procedures are described in 3GPP TS 25.331.

In UMTS, the system timeline is divided into radio frames. Each radio frame has a duration of 10 milliseconds (ms) and is identified by a 12-bit system frame number (SFN). The SFN is reset to 0 at a specific time, incremented by one for each frame thereafter, and reset to zero after reaching the maximum value of 4095.

Figure 4:
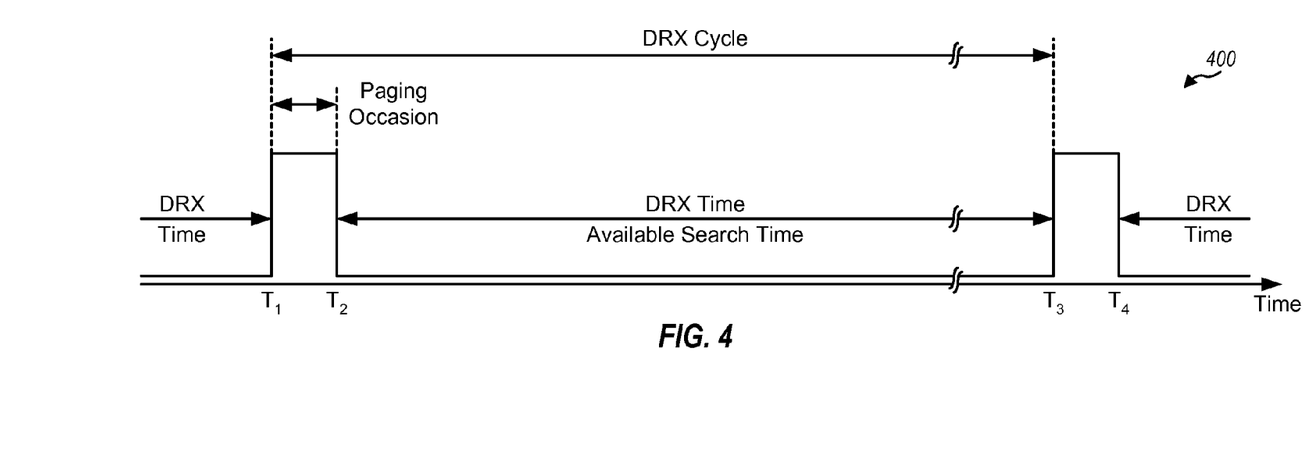
FIG. 4 shows a timeline for a UE in a DRX mode.

FIG. 4 shows a timeline 400 for the UE while in a DRX mode of operation. The UE may operate in the DRX mode while in the Idle mode, the CELL_PCH state, or the URA_PCH state. The DRX mode is also referred to as slotted mode paging. In the DRX mode, the UE is assigned paging occasions, which are specific radio frames in which the UE can receive pages. The paging occasions for the UE are separated by a time interval called a DRX cycle. The DRX cycle is configurable for the UE and can range from 80 ms to 5.12 seconds, but is typically equal to 1.28 seconds. The paging occasions for the UE are determined based on several parameters such as an International Mobile Subscriber Identifier (IMSI) that is unique for the UE.

The UE may wake up periodically during its paging occasions to receive any pages sent to the UE. Pages are not sent to the UE outside of the paging occasions. The UE may thus go to sleep during the time between its paging occasions if there are no other tasks to perform. The UE may power down as much circuitry as possible while asleep in order to conserve battery power.

The UE may perform a manual search or an automatic search to look for PLMNs. The UE may perform a manual search whenever requested by a user. A goal of the manual search is to return a comprehensive list of all PLMNs found by the UE to the user. The UE may periodically perform an automatic search if it is camping on a PLMN that is of lower priority than the home PLMN. A goal of the automatic search is to find a PLMN of higher priority than the serving PLMN. The UE may perform an automatic search whenever a periodic search timer expires. The timer value may be provided by the service provider. Table 2 summarizes key attributes of the manual and automatic searches.

TABLE 2

| | Manual Search | Automatic Search |
|---|---|---|
| When to perform a search | Whenever requested by the user. | Periodically whenever a periodic search timer expires and the UE is not on the highest priority PLMN. |
| Goal of search | Find all PLMNs the UE. | Find a PLMN of higher priority detected by than the serving PLMN. |

The UE may also perform other types of searches. For example, the UE may perform a search for PLMNs stored in the acquisition database, which is called an acquisition database search. The UE has pertinent information (e.g., timing, frequency, and scrambling code information) for the PLMNs in the acquisition database. The UE may thus be able to perform the acquisition database search in relatively short period of time. The UE may also perform the acquisition database search prior to an automatic search or a manual search. The UE may use the results of the acquisition database search to reduce the search space for the automatic or manual search.

A PLMN search may thus be an automatic search, a manual search, or some other type of search. For a PLMN search, the UE may perform a search for UMTS networks (or UMTS search), a search for GSM networks (or GSM search), a search for wireless networks of other radio technologies, or a combination thereof. The particular networks to search may be dependent on various factors such as the UE capabilities, the user subscription, the mode or state of the UE, and so on.

The UE may perform a PLMN search as background task whenever requested or triggered. Foreground tasks (e.g., exchanging data, receiving pages, etc.) have higher priority and are performed first. Background tasks have lower priority and are performed, e.g., when there are no foreground tasks to perform. The UE may perform a PLMN search as background task, whenever possible, in order to avoid or reduce disruption to foreground tasks.

While in the CELL_PCH state, URA_PCH state, or Idle mode, the UE may search for PLMNs during the DRX time when the UE will not receive pages from the serving cell. To avoid missing pages, the UE may suspend the PLMN search during its paging occasions, receive the paging channel from the serving cell, and then continue the PLMN search. This allows the UE to search for PLMNs while minimizing page loss. In FIG. 4, one paging occasion for the UE occurs between times $T_1$ and $T_2$, and another paging occasion for the UE occurs between times $T_3$ and $T_4$. The DRX time for the UE is prior to time $T_1$, between times $T_2$ and $T_3$, and after time $T_4$. The DRX time is potentially available for a PLMN search, unless other tasks need to be performed. The UE may search for PLMNs during the DRX time.

While in the CELL_DCH state, the UE may search for PLMNs during transmission gaps. The UE may operate in a compressed mode in which the UMTS network provides gaps in transmission to allow the UE to make measurements for neighbor cells. The UE may temporarily leave the serving cell during a transmission gap to make measurements for other cells without losing data from the serving cell. While in the CELL_FACH state, the UE may search for PLMNs during reselection measurement occasions, which are time intervals in which the UE can temporarily leave the serving cell to make measurements for other cells. In the CELL_DCH or CELL_FACH state, the UE may also search for PLMNs during time periods in which the UE does not expect to exchange any data or signaling with the UMTS network.

The UE may also have capability to receive multiple cells or frequencies simultaneously. For example, the UE may have multiple antennas and multiple receivers that may be used for receive diversity and/or multiple-input multiple-output (MIMO) transmission. The UE may use one or more receivers to receive data, signaling, and/or pages from the serving cell and may use one or more other receivers to search for PLMNs. With this capability, the UE may perform a PLMN search at any time and in any state and mode by using a subset of the available receivers. The following description assumes that the UE has one receiver.

The UE may operate in the UTRA RRC connected mode, especially in the CELL_PCH or URA_PCH state, for an extended period of time. When UE is in the CELL_PCH or URA_PCH state, an automatic search may be triggered automatically (e.g., due to expiry of the periodic search timer) and/or a manual search may be triggered by the user. Not performing the search in these states may lead to unsatisfactory user experience. For example, if the automatic search is not performed, then the user may stay on a visited PLMN (VPLMN) for a longer duration of time even when the HPLMN is available, thus incurring extra cost to the user and/or the service provider. If the manual search is not performed, then the user may not get a list of all available PLMNs and may not be able to select a preferred PLMN manually.

The UE may perform PLMN searches while in the UTRA RRC connected mode in order to improve performance and user experience. The UE may process search requests in different manners for different states of the UTRA RRC connected mode based on the characteristics of these states.

The UE may accept search requests and perform PLMN searches when operating in the CELL_PCH or URA_PCH state. A request may be for an automatic search, a manual search, or some other type of search. The UE may perform a requested PLMN search during the DRX time in order to avoid missing pages. The UE may save state information for the PLMN search prior to a paging occasion and may resume the PLMN search using the saved state information at the end of the paging occasion.

The UE may reject an automatic search request while in the CELL_DCH or CELL_FACH state. The NAS may issue an automatic search request to the RRC whenever the periodic search timer expires. If the RRC rejects the automatic search request, then the NAS may reissue the request at a later time, e.g., when a short timer expires. The short timer may have a shorter duration than the periodic search timer, e.g., the short timer may be on the order of seconds whereas the periodic search timer may be on the order of minutes. In this case, rejecting the automatic search request by the RRC may not adversely impact performance. Alternatively, the RRC may accept and hold the automatic search request while in the CELL_DCH or CELL_FACH state and may perform an automatic search at appropriate time, e.g., after transitioning to the CELL_PCH or URA_PCH state.

The UE may reject a manual search request while in the CELL_DCH or CELL_FACH state if (a) the tasks being performed in the CELL_DCH or CELL_FACH state are deemed to be more important than a manual search and (b) performing the manual search would disrupt these tasks. The NAS may receive a manual search request from the user and issue the request to the RRC. If the RRC rejects the request, then the NAS may reissue the request when the short timer expires. Alternatively, the RRC may accept the manual search request and perform a manual search at a later time, e.g., after transitioning to the CELL_PCH or URA_PCH state.

While in the UTRA RRC connected mode, the UE may often transition from either the CELL_PCH or URA_PCH state to either the CELL_DCH or CELL_FACH state to perform cell update, URA update, packet-switched attachment, etc. The UE may remain in the CELL_DCH or CELL_FACH state for a short period of time to perform cell/URA update or registration and may then return to the CELL_PCH or URA_PCH state. Since registration is transparent to the user, rejecting the manual search request and returning zero PLMNs to the user may lead to bad user experience. Thus, the UE may accept a manual search request while in the CELL_DCH or CELL_FACH state if the UE entered the state due to registration. The UE may perform a manual search whenever the UE transitions to the CELL_PCH state, the URA_PCH state, or the Idle mode. The UE may reject the manual search request if the UE entered the CELL_DCH or CELL_FACH state due to a reason other than registration, e.g., to send data or signaling, to respond to a page, etc.

Table 3 lists the handling of search requests in accordance with one design. As noted above, even when a search request is rejected, the request may be reissued a short time later.

TABLE 3

| | CELL_DCH & CELL_FACH | CELL_PCH & URA_PCH |
|---|---|---|
| Automatic Search | Reject automatic search request. | Accept request and perform automatic search during DRX time. |

TABLE 3-continued

| | CELL_DCH & CELL_FACH | CELL_PCH & URA_PCH |
|---|---|---|
| Manual Search | Accept request if entered CELL_DCH or CELL_FACH due to registration and delay the search until transition to CELL_PCH, URA_PCH, or Idle mode. Reject request otherwise. | Accept request and perform manual search during DRX time. |

The description above generally relates to handling of new search requests. A search request may have been accepted in one RRC state. A PLMN search may or may not have been started when the UE moves to another RRC state. The search request and PLMN search may be handled in various manners due to state transitions.

The UE may often temporarily move out of the CELL_PCH or URA_PCH state due to cell reselection, uplink data transfer, location area update, routing area update, etc. The UE may have accepted a search request while in the CELL_PCH or URA_PCH state and may have even started a PLMN search. The UE may then transition to another RRC state such as the CELL_FACH or CELL_DCH state. Canceling the PLMN search due to the transition to another RRC state may lead to bad user experience since the cause of the state transition may be transparent to the user.

The following terminology may be used for PLMN searches. A search may be canceled after a state transition and would not be performed unless the same search request is reissued (e.g., by the NAS) or another search request is issued. A search may be suspended after a state transition. A suspended search may have its intermediate results and search state information saved, in which case the search may be performed at a later time from where it was left off. Alternatively, a suspended search may have its intermediate results and/or search state information discarded, in which case the search may be performed at a later time from the beginning. A suspended search may thus be resumed at a later time either from the beginning or from where it was left off. A suspended search may also remain suspended after a state transition. A search that is ongoing may also be continued after a state transition.

For simplicity, the CELL_PCH state, URA_PCH state, and Idle mode may be considered as idle states. The CELL_FACH and CELL_DCH states may be considered as active states. In general, a search may be canceled, suspended, resumed, or continued after a transition from one state to another state. Whether to cancel, suspend, resume, or continue the search may be dependent on various factors such as, e.g., whether the search was ongoing or suspended prior to the state transition, whether the search results are still relevant after the state transition, the cause of the state transition, the expected length of stay in the new state, etc.

For a transition from CELL_PCH/URA_PCH to CELL_FACH, the UE may suspend an automatic or manual search that was accepted in the CELL_PCH or URA_PCH state. The UE may stay in the CELL_FACH state temporarily and may then resume the automatic or manual search upon transitioning to an idle state. For a transition from CELL_PCH/URA_PCH to CELL_DCH, the UE may cancel an automatic search, which may be reissued by the NAS when the short timer expires. The UE may suspend a manual search upon entering the CELL_DCH state and may resume the manual search upon transitioning to an idle state. For a transition from CELL_PCH/URA_PCH to Idle mode, the UE may cancel an automatic search since it may not be necessary to find a higher priority PLMN. The UE may start a manual search if it was not performed or may continue the search if it is ongoing.

For a transition from Idle mode to CELL_FACH/CELL_DCH, the UE may cancel the automatic search, which may be reissued by the NAS. The UE may suspend a manual search if it entered the CELL_FACH/CELL_DCH state due to registration and may then resume the manual search upon transitioning to an idle state. The UE may cancel the manual search if it entered the CELL_FACH/CELL_DCH state due to a reason other than registration, and NAS may reissued the manual search request.

For a transition from CELL_FACH to CELL_PCH/URA_PCH, the UE may resume an automatic or manual search if it was suspended during the CELL_FACH state. For a transition from CELL_FACH to Idle mode, the UE may cancel an automatic search, which may be reissued by the NAS. The UE may (a) start a manual search if it was not performed at all in any of the RRC states, (b) resume the manual search if it was suspended in the CELL_FACH state, or (c) cancel the manual search, which may be reissued by the NAS. For a transition from CELL_FACH to CELL_DCH, the UE may cancel an automatic search, which may be reissued by the NAS. The UE may suspend a manual search while in the CELL_DCH state and may resume the manual search upon transitioning to an idle state.

For a transition from CELL_DCH to CELL_PCH/URA_PCH/Idle mode, the UE may resume a manual search if it was suspended during the CELL_DCH state. The UE may do nothing for an automatic search if it was canceled upon transitioning to the CELL_DCH state. For a transition from CELL_DCH to CELL_FACH, the UE may suspend a manual search while in the CELL_FACH state and may resume the manual search upon transitioning to an idle state. The UE may do nothing for an automatic search if it was canceled due to a transition to the CELL_DCH state.

Table 4 shows a specific design for handling automatic and manual searches for transitions between the various states. An "X" in Table 4 indicates a transition or condition that is not applicable.

Some example designs have been described above for handling searches through state transitions. In general, a search may be handled in any manner for each possible state transition based on the desired outcome.

The UE may often transition to the CELL_FACH or CELL_DCH state to perform registration for cell reselection, location area update, routing area update, etc. It may be desirable not to cancel a search each time the UE transitions to the CELL_FACH or CELL_DCH state for registration. Doing so may prevent the search from being completed due to frequent transition to the CELL_FACH or CELL_DCH for registration. It may also be desirable not to cancel a manual search for events that are transparent to the user, e.g., transition from CELL_PCH/URA_PCH to CELL_FACH for cell/URA update due to reselections. The user is not aware of these events and may not want the manual search terminated.

Figure 5:
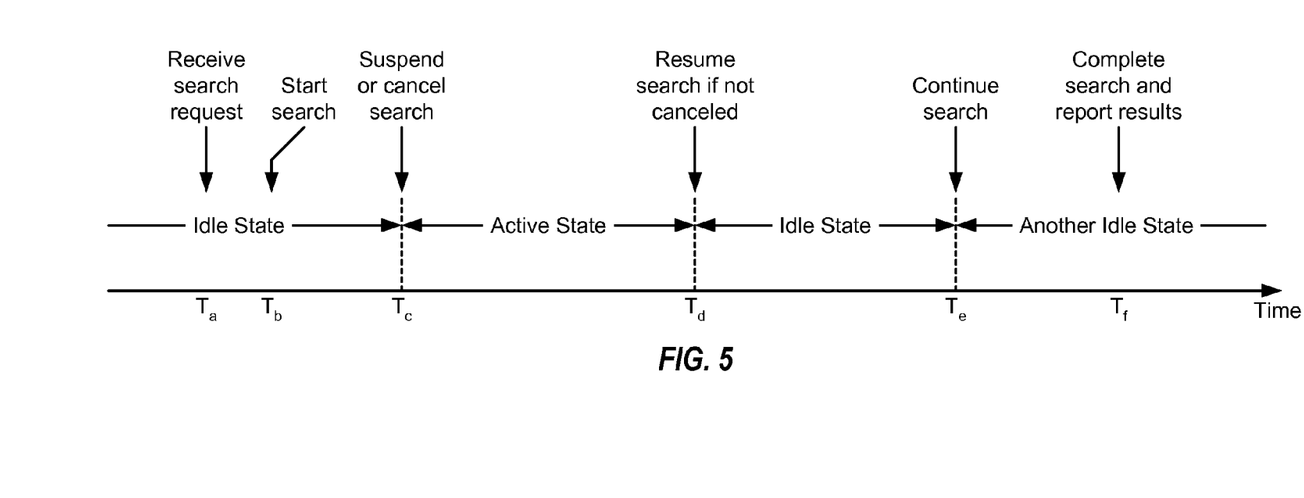
FIG. 5 shows an example of processing for a search with state transitions.

FIG. 5 shows an example of processing for a search with state transitions. At time $T_a$, the UE receives a request for a search while in an idle state, which may be CELL_PCH, URA_PCH, or Idle mode. The UE starts the search at time $T_b$. At time $T_c$, the UE transitions from the idle state to an active state, which may be CELL_DCH or CELL_FACH, and suspends or cancels the search. At time $T_d$, the UE transitions to an idle state and resumes the search if it is not canceled. At time $T_e$, the UE transitions to another idle state and continues the search. At time $T_f$, the UE completes the search and provides the search results. The UE may also perform the search in other manners.

A PLMN may operate on one or more frequency bands. Each frequency band may cover multiple UMTS channels that may be spaced apart by approximately 5 MHz. Each UMTS channel has a bandwidth of 3.84 MHz and a center frequency that is given in 200 KHz resolution. Each UMTS channel is identified by a specific channel number, which may be a UARFCN (UTRA absolute radio frequency channel number). The UARFCNs for various frequency bands are given in 3GPP TS 25.101, entitled "User Equipment (UE) radio transmission and reception (FDD)," Release 7, March 2006, which is publicly available. A UMTS network within a PLMN typically operates on one or more specific UARFCNs.

TABLE 4

| | From | | | | |
|---|---|---|---|---|---|
| To | CELL_DCH | CELL_FACH | CELL_PCH & URA_PCH | Idle mode | Search Type |
| CELL_DCH | X | Canceled Suspended or Canceled | Canceled Suspended or Canceled | Canceled Suspended or Canceled | Automatic Manual |
| CELL_FACH | X Suspended | X | Suspended Suspended | Suspended Suspended or Canceled | Automatic Manual |
| CELL_PCH & URA_PCH | X Resumed | Resumed Resumed | X | X | Automatic Manual |
| Idle mode | X Resumed | Resumed Resumed | Continued Continued | X | Automatic Manual |

In the design shown in Table 4, an automatic search is (a) canceled upon transitioning to the CELL_DCH state and may be reissued by the NAS and (b) suspended upon transitioning to the CELL_FACH state from an idle state. A manual search may be (a) suspended upon transitioning from an idle state to an active state for registration or (b) canceled if the transition is for a reason other than registration. A manual search may be kept suspended for a transition from one active state to another active state. A search may be continued or resumed upon transitioning to an idle state.

The UE may perform a manual search in various manners. For example, the UE may perform a manual search in a given frequency band as follows:

Perform a coarse frequency scan across the entire frequency band, measure the received power at coarse frequencies spaced apart by $\Delta f_C$ (e.g., $\Delta f_C = 2$ MHz), and identify strong coarse frequencies, Perform a fine frequency scan for a range of UARFCNs around each strong coarse frequency and identify strong UARFCNs, Attempt acquisition on each strong UARFCN, and Obtain the PLMN ID of each PLMN found, e.g., by reading a master information block (MIB) broadcast by the cells in the PLMN.

The UE may also perform an automatic search in various manners. For example, the UE may perform an automatic search in a given frequency band as follows:

Perform a coarse frequency scan and identify strong coarse frequencies,

Perform a fine frequency scan and identify strong UARFCNs,

Attempt acquisition on each strong UARFCN, and

Obtain system information for higher priority cells found, e.g., by reading the MIB and system information block type 1 (SIB1) and system information block type 3 (SIB3) broadcast by the cells in the PLMN.

The searches may be performed in other manners for other wireless networks and radio technologies.

Figure 6:
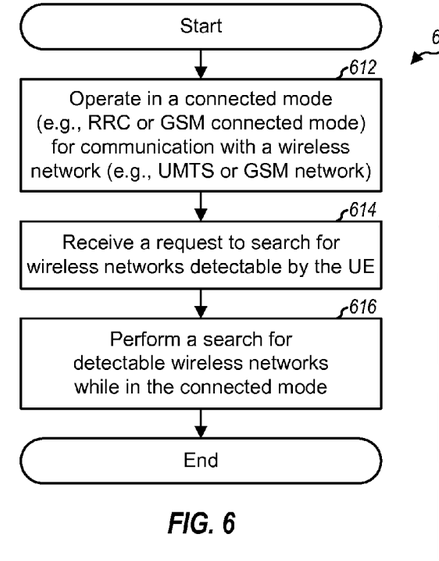
FIG. 6 shows a process for performing a manual search in a connected mode.

FIG. 6 shows a process 600 for performing a manual search in a connected mode. The UE operates in a connected mode for communication with a wireless network (block 612). The UE may operate in an RRC connected mode for communication with a UMTS network, a GSM connected mode or a GPRS packet transfer mode for communication with a GSM network, or some other connected mode for communication with other type of wireless networks. The UE receives a request to search for wireless networks (or PLMNs) detectable by the UE (block 614). The UE performs a search for detectable wireless networks while in the connected mode (block 616). For UMTS, the UE may receive the request while in the CELL_PCH or URA_PCH state and may perform the search while in the CELL_PCH or URA_PCH state. The UE may also receive the request while in the CELL_DCH or CELL_FACH state and may perform the search after transitioning to the CELL_PCH or URA_PCH state. The UE may perform the search as background task during DRX time for the UE.

Figure 7:
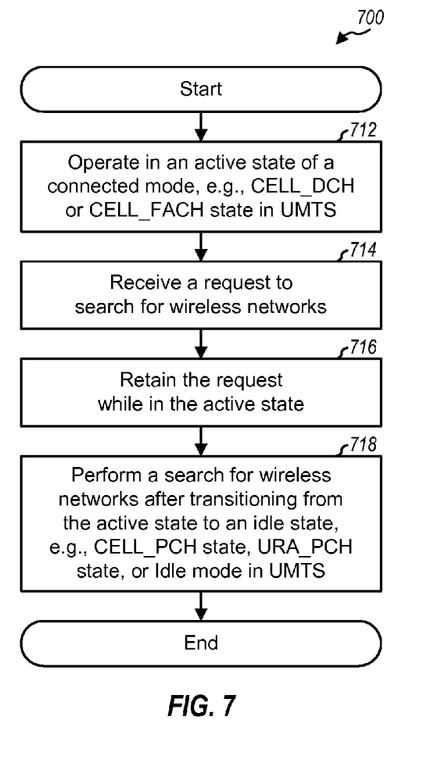
FIG. 7 shows a process for handling a search request in an active state.

FIG. 7 shows a process 700 for handling a search request in an active state. The UE operates in an active state of a connected mode, e.g., the CELL_DCH or CELL_FACH state in UMTS (block 712). The UE receives a request to search for higher priority or detectable wireless networks (block 714). The UE retains the request while in the active state (block 716). The UE performs a search for wireless networks after transitioning from the active state to an idle state, e.g., the CELL_PCH state, URA_PCH state, or Idle mode in UMTS (block 716).

Figure 8:
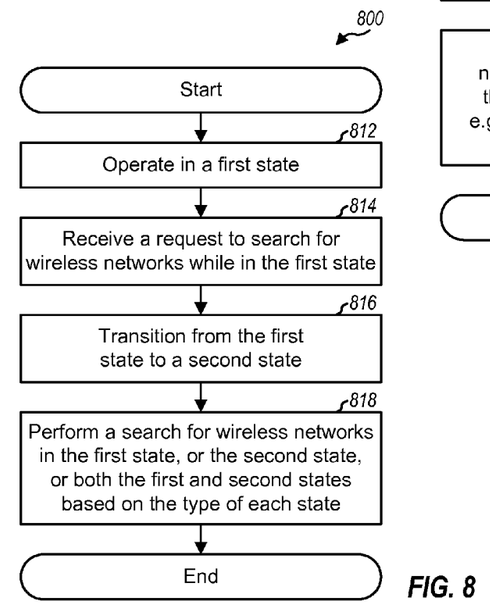
FIG. 8 shows a process for handling a search across state transitions.

FIG. 8 shows a process 800 for handling a search across state transitions. The UE operates in a first state (block 812). The UE receives a request to search for higher priority or detectable wireless networks while in the first state (block 814). The UE transitions from the first state to a second state (block 816). The UE performs a search for wireless networks in the first state, or the second state, or both the first and second states based on the type of each state (block 818).

The UE may perform the search in the first state if it is an idle state and may continue the search in the second state if it is another idle state. The UE may perform the search in the first state if it is an idle state and may suspend or cancel the search in the second state if it is an active state. The UE may transition from the second state to a third state and may resume the search in the third state if it is an idle state and the search has not been canceled. The UE may delay the search in the first state if it is an active state and may perform the search in the second state if it is an idle state.

For UMTS, the UE may perform the search in the first state if it is one of a plurality of idle states comprising the CELL_PCH state, the URA_PCH state, and the Idle mode. The UE may delay the search in the first state if it is one of a plurality of active states comprising the CELL_DCH state and the CELL_FACH state. The UE may perform the search in the second state if it is an idle state and may suspend the search in the second state if it is an active state. For example, the UE may perform the search in the first state, which may be the CELL_PCH or URA_PCH state. The UE may suspend the search in the second state, which may be the CELL_FACH or CELL_DCH state, if the transition to the second state is triggered by registration, and may cancel the search in the second state if the transition is not triggered by registration.

Figure 9:
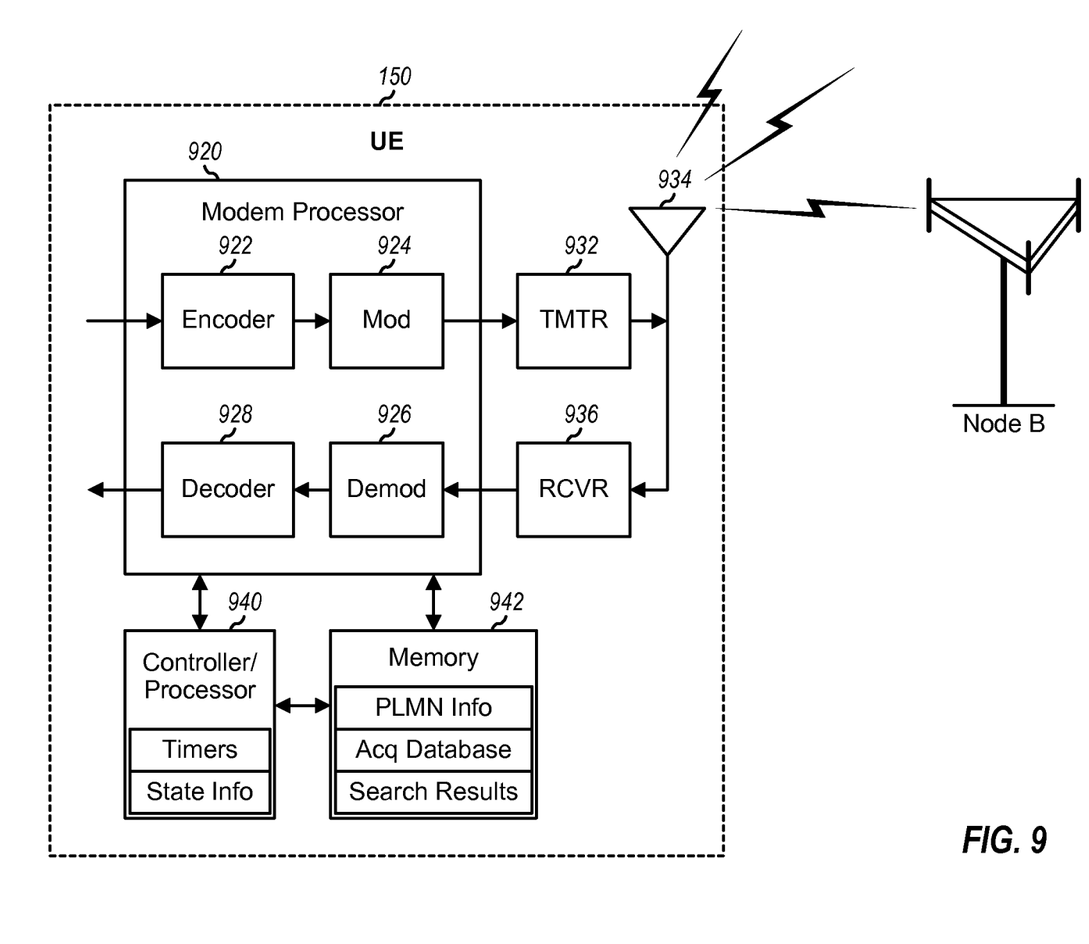
FIG. 9 shows a block diagram of the UE.

FIG. 9 shows a block diagram of a design of UE 150. On the uplink, data and signaling to be sent by UE 150 are processed (e.g., formatted, encoded, and interleaved) by an encoder 922 and further processed (e.g., modulated, channelized, and scrambled) by a modulator (Mod) 924 in accordance with an applicable radio technology (e.g., W-CDMA, GSM, or cdma2000) to generate output chips. A transmitter (TMTR) 932 then conditions (e.g., converts to analog, filters, amplifies, and frequency upconverts) the output chips and generates an uplink signal, which is transmitted via an antenna 934.

On the downlink, antenna 934 receives downlink signals transmitted by the Node Bs and provides a received signal. A receiver (RCVR) 936 conditions (e.g., filters, amplifies, frequency downconverts, and digitizes) the received signal and provides samples. A demodulator (Demod) 926 processes (e.g., descrambles, channelizes, and demodulates) the samples and provides symbol estimates. A decoder 928 further processes (e.g., deinterleaves and decodes) the symbol estimates and provides decoded data. Encoder 922, modulator 924, demodulator 926, and decoder 928 may be implemented by a modem processor 920. These units perform processing in accordance with the radio technology (e.g., W-CDMA, GSM, or cdma2000) used by the serving wireless network. For example, demodulator 926 may perform descrambling with scrambling sequences, despreading with orthogonal variable spreading factor (OVSF) codes, data demodulation, and so on, for W-CDMA. Demodulator 926 may perform matched filtering and equalization for GSM.

A controller/processor 940 controls the operation at UE 150. A memory 942 stores data and program codes for UE 150. Controller/processor 940 may implement process 600 in FIG. 6, process 700 in FIG. 7, process 800 in FIG. 8, and/or other processes. Controller/processor 940 may determine whether to accept search requests, when to perform PLMN searches, etc. Controller/processor 940 may implement timers to determine the DRX time for the UE, when to perform automatic searches, when to reissue search requests, etc. Controller/processor 940 and/or memory 942 may store state information for a search that is in progress and/or state information for the serving cell. Memory 942 may store PLMN information, the acquisition database, search results, and so on.

For clarity, the search techniques have been specifically described for UMTS and GSM. These techniques may also be used for other wireless networks such as cdma2000 networks, wireless local area networks (WLANs), and so on. The techniques may be used for any number of radio technologies, e.g., for UMTS only, for GSM only, for UMTS and GSM, for UMTS and cdma2000, or for some other combination of radio technologies.

The search techniques described herein may be implemented by various means. For example, these techniques may be implemented in hardware, firmware, software, or a combination thereof. For a hardware implementation, the processing units used to perform searches may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

For a firmware and/or software implementation, the search techniques may be implemented with modules (e.g., procedures, functions, and so on) that perform the functions described herein. The firmware and/or software codes may be stored in a memory (e.g., memory 942 in FIG. 9) and executed by a processor (e.g., processor 940). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples shown herein but is to be accorded the widest scope consistent with the principles and novel features disclosed herein.

What is claimed is:

1. An apparatus, comprising:
a processor configured to: operate in a first state; receive a request to search for wireless networks while operating in the first state; determine whether to perform a search for wireless networks in the first state but not a second state, in the second state but not the first state, or in both the first state and the second state; transition from the first state to the second state; and perform the search for wireless networks in at least one of the first state and or the second state based on the determination, wherein the processor performs the search in the first state if the first state is an idle state that comprises one or more of a CELL_PCH state, a URA_PCH state, or an Idle mode in Universal Mobile Telecommunication System (UMTS) and continues the search in the second state if the second state is another idle state that comprises one or more of the CELL PCH state, the URA PCH state, or the Idle mode in UMTS; and a memory coupled to the processor.

2. The apparatus of claim 1, wherein the processor further performs the search in the first state if the first state is an idle state and suspends the search in the second state if the second state is an active state that comprises one or more of a CELL_DCH state or a CELL_FACH state in UMTS.

3. The apparatus of claim 2, wherein the processor transitions from the second state to a third state and resumes the search in the third state if the third state is an idle state that comprises one or more of the CELL_PCH state, the URA_PCH state, or the Idle mode in UMTS.

4. An apparatus, comprising:
a processor configured to: operate in a first state;
receive a request to search for wireless networks while operating in the first state; determine whether to perform a search for wireless networks in the first state but not a second state, in the second state but not the first state, or in both the first state and the second state; transition from the first state to the second state; and perform the search for wireless networks in at least one of the first state or the second state based on the determination, wherein the processor performs the search in the first state and continues the search in the second state if the first state is an idle state that comprises one or more of a CELL_PCH state, a URA_PCH state, or an Idle mode in Universal Mobile Telecommunication System (UMTS) and the second state is another idle state that comprises one or more of the CELL_PCH state, the URA_PCH state, or the Idle mode in UMTS, and wherein the processor cancels the search in the second state if the second state is an active state that comprises one or more of a CELL_DCH state or a CELL_FACH state in UMTS and the transition to the second state is not triggered by registration; and a memory coupled to the processor.

5. The apparatus of claim 1, wherein the processor further performs the search in the first state if the first state is comprises one or more of a plurality of idle states comprising a the CELL_PCH state, a the URA_PCH state, or the and an Idle mode in Universal Mobile Telecommunication System (UMTS) UMTS and delays the search in the first state if the first state is comprises one or more of a plurality of active states comprising a the CELL_DCH state and a or the CELL_FACH state in UMTS.

6. The apparatus of claim 5, wherein the processor further performs the search in the second state if the second state is comprises one or more of the plurality of idle states CELL_PCH state, the URA_PCH state, or the Idle mode in UMTS and suspends the search in the second state if the second state is comprises one or more of the plurality of active states CELL_DCH state or the CELL_FACH state in UMTS.

7. The apparatus of claim 1, wherein the request is for higher priority wireless networks or detectable wireless networks.

8. The apparatus of claim 1, wherein the request is a user-initiated search request and wherein the processor rejects the user-initiated search request in response to determining that executing tasks at the processor have a higher priority than the user-initiated search request and that performing the search would disrupt the tasks.

9. The apparatus of claim 2, wherein the processor transitions from the second state to a third state and wherein the processor restarts the search anew in the third state when the third state is an idle state that comprises one or more of the CELL_PCH state, the URA_PCH state, or the Idle mode in UMTS.

10. An apparatus, comprising: a processor
configured to: operate in a first state; receive a request to search for wireless networks while operating in the first state; determine whether to perform a search for wireless networks in the first state but not a second state, in the second state but not the first state, or in both the first state and the second state; transition from the first state to the second state; and perform the search for wireless networks in at least one of the first state or the second state based on the determination, wherein the processor performs the search in the first state and continues the search in the second state if the first state and the second state are idle states that comprise one or more of a CELL_PCH state, a URA_PCH state, or an Idle mode in Universal Mobile Telecommunication System (UMTS), and wherein the processor delays the search while operating in the first state if the first state is an active state where first state comprises of a CELL_DCH state and a CELL_FACH state in UMTS and performs the search in the second state after the transition to the second state if the first state is an active state that comprises one or more of a CELL_DCH state or a CELL_FACH state in UMTS and the second state is an idle state that comprises one or more of the CELL_PCH state, the URA_PCH state, or the Idle mode in UMTS; and a memory coupled to the processor.

11. An apparatus comprising:
a processor configured to:
   operate in a first state;
   receive a user-initiated search request to search for wireless networks while operating in the first state, wherein the first state is a CELL_PCH state or a URA_PCH state in Universal Mobile Telecommunication System (UMTS);
   determine whether to perform a search for wireless networks in the first state but not a second state, in the second state but not the first state, or in both the first state and the second state, wherein the second state is a CELL_FACH state or a CELL_DCH state in UMTS;
   transition from the first state to the second state; and
   perform the search for wireless networks in at least one of the first state or the second state based on the determination, wherein the processor performs the search in the first state, suspends the search in the second state if the transition to the second state is triggered by registration, and cancels the search in the second state if the transition to the second state is not triggered by registration; and
a memory coupled to the processor.

12. A method: comprising:
operating in a first state; receiving a request to search for wireless networks while operating in the first state; determining whether to perform a search for wireless networks in the first state but not a second state, in the second state but not the first state, or in both the first state and the second state; transitioning from the first state to the second state; and performing the search for wireless networks in at least one of the first state or the second state based on the determination, wherein performing the search comprises performing the search in the first state if the first state is an idle state that comprises one or more of a CELL_PCH state, a URA_PCH state, or an Idle mode in Universal Mobile Telecommunication System (UMTS) and continuing the search in the second state if the second state is an active another idle state that comprises one or more of the CELL_PCH state, the URA_PCH state, or the Idle mode in UMTS.

13. A method comprising:
operating in a first state; receiving a request to search for wireless networks while operating in the first state; determining whether to perform a search for wireless networks in the first state but not a second state, in the second state but not the first state, or in both the first state and the second state; transitioning from the first state to the second state; and performing the search for wireless networks in at least one of the first state or the second state based on the determination, wherein performing the search comprises: performing the search in the first state and continuing the search in the second state if the first state and the second state are idle states that comprise one or more of a CELL_PCH state, a URA_PCH state, or an Idle mode in Universal Mobile Telecommunication System (UMTS); and delaying the search while operating in the first state and performing the search in the second state after the transition to the second state if the first state is an active state that comprises one or more of a CELL_DCH state or a CELL_FACH state in UMTS and the second state is an idle state that comprises one or more of the CELL_PCH state, the URA_PCH state, or the Idle mode in UMTS.

14. A tangible storage medium storing processor-executable software instructions configured to cause a processor to:
operate in a first state; receive a request to search for wireless networks while operating in the first state; determine whether to perform a search for wireless networks in the first state but not a second state, in the second state but not the first state, or in both the first state and the second state; transition from the first state to the second state; and perform the search for wireless networks in at least one of the first state or the second state based on the determination, wherein performing the search comprises performing the search in the first state if the first state is an idle state that comprises one or more of a CELL_PCH state, a URA_PCH state, or an Idle mode in Universal Mobile Telecommunication System (UMTS) and continuing the search in the second state if the second state is another idle state that comprises one or more of the CELL_PCH state, the URA_PCH state, or the Idle mode in UMTS.

15. A tangible storage medium storing processor-executable software instructions configured to cause a processor to:
operate in a first state ;receive a request to search for wireless networks while operating in the first state; determine whether to perform a search for wireless networks in the first state but not a second state, in the second state but not the first state, or in both the first state and the second state; transition from the first state to the second state; and perform the search for wireless networks in at least one of the first state or the second state based on the determination, wherein performing the search comprises: performing the search in the first state and continuing the search in the second state if the first state and the second state are idle states that comprise one or more of a CELL_PCH state, a URA_PCH state, or an Idle mode in Universal Mobile Telecommunication System (UMTS); and delaying the search while operating in the first state and performing the search in the second state after the transition to the second state if the first state is an active state that comprises one or more of a CELL_DCH state or a CELL_FACH state in UMTS and the second state is an idle state that comprises one or more of the CELL_PCH state, the URA_PCH state, or the Idle mode in UMTS.

16. An apparatus comprising:
a processor configured to: operate in a first state; receive a request to search for wireless networks while operating in the first state; perform a search for wireless networks when the first state is an idle state that comprises one or more of a CELL_PCH state, a URA_PCH state, or an Idle mode in Universal Mobile Telecommunication System (UMTS); delay the search when the first state is an active state that comprises one or more of a CELL_DCH state or a CELL_FACH state in UMTS; transition from the first state to a second state; suspend the search when the search was started in the first state and when the second state is an active state that comprises one or more of the CELL_DCH state or the CELL_FACH state in UMTS; and perform the search when the search was not started in the first state and when the second state is an idle state that comprises one or more of the CELL_PCH state, the URA_PCH state, or the Idle mode in UMTS; and a memory coupled to the processor.

17. An apparatus comprising:
means for operating in a first state; means for receiving a request to search for wireless networks while operating in the first state; means for determining whether to perform a search for wireless networks in the first state but not a second state, in the second state but not the first state, or in both the first state and the second state; means for transitioning from the first state to the second state; and means for performing the search for wireless networks in at least one of the first state and or the second state based on the determination, wherein the means for performing the search comprises means for performing the search in the first state if the first state is an idle state that comprises one or more of a CELL_PCH state, a URA_PCH state, or an Idle mode in Universal Mobile Telecommunication System (UMTS) and continuing the search in the second state if the second state is another idle state that comprises one or more of the CELL_PCH state, the URA_PCH state, or the Idle mode in UMTS.

18. The apparatus of claim 17, wherein the means for performing the search further comprises means for performing the search in the first state if the first state is an idle state and suspending the search in the second state if the second state is an active state that comprises one or more of a CELL_DCH state or a CELL_FACH state in UMTS.

19. The apparatus of claim 18, wherein the means for performing the search further comprises means for transitioning from the second state to a third state and means for resuming the search in the third state if the third state is an idle state that comprises one or more of the CELL_PCH state, the URA_PCH state, or the Idle mode in UMTS.

20. The apparatus of claim 18, wherein the means for performing the search further comprises means for transitioning from the second state to a third state and wherein the means for performing the search comprises means for restarting the search anew in the third state if the third state is an idle state that comprises one or more of the CELL_PCH state, the URA_PCH state, or the Idle mode in UMTS.

21. The apparatus of claim 17, wherein the means for performing the search further comprises means for performing the search in the first state if the first state is comprises one or more of a plurality of idle states comprising a the CELL_PCH state, a the URA_PCH state, or the and an Idle mode in Universal Mobile Telecommunication System (UMTS) UMTS and delaying the search in the first state if the first state is comprises one or more of a plurality of active states comprising a the CELL_DCH state and a or the CELL_FACH state in UMTS.

22. The apparatus of claim 21, wherein the means for performing the search further comprises means for performing the search in the second state if the second state is comprises one or more of the plurality of idle states CELL_PCH state, the URA_PCH state, or the Idle mode in UMTS and suspending the search in the second state if the second state is comprises one or more of the plurality of active states CELL_DCH state or the CELL_FACH state in UMTS.

23. The apparatus of claim 17, wherein the request is for higher priority wireless networks or detectable wireless networks.

24. The apparatus of claim 17, wherein the request is a user-initiated search request and wherein the means for performing the search comprises means for rejecting the user-initiated search request in response to determining that executing tasks at the means for performing the search have a higher priority than the user-initiated search request and that performing the search would disrupt the tasks.

25. An apparatus, comprising:
means for operating in a first state; means for receiving a request to search for wireless networks while operating in the first state; means for determining whether to perform a search for wireless networks in the first state but not a second state, in the second state but not the first state, or in both the first state and the second state; means for transitioning from the first state to the second state; and means for performing the search for wireless networks in at least one of the first state or the second state based on the determination, wherein the means for performing the search comprises: means for performing the search in the first state and continuing the search in the second state if the first state is an idle state that comprises one or more of a CELL_PCH state, a URA_PCH state, or an Idle mode in Universal Mobile Telecommunication System (UMTS) and the second state is another idle state that comprises one or more of the CELL_PCH state, the URA PCH state, or the Idle mode in UMTS (UMTS); and means for canceling the search in the second state if the second state is an active state that comprises one or more of a CELL_DCH state or a CELL_FACH state in UMTS and the transition to the second state is not triggered by registration.

26. An apparatus of, comprising:
means for operating in a first state; means for receiving a request to search for wireless networks while operating in the first state; means for determining whether to perform a search for wireless networks in the first state but not a second state, in the second state but not the first state, or in both the first state and the second state;
means for transitioning from the first state to the second state; and means for performing the search for wireless networks in at least one of the first state or the second state based on the determination, wherein the means for performing the search comprises: means for performing the search in the first state and continuing the search in the second state if the first state and the second state are idle states that comprise one or more of a CELL_PCH state, a URA_PCH state, or an Idle mode in Universal Mobile Telecommunication System (UMTS); and
means for delaying the search while operating in the first state if the first state is an active state that comprises one or more of a CELL_DCH state or a CELL_FACH state in UMTS and performing the search in the second state after the transition to the second state if the first state is an active state and the second state is an idle state that comprises one or more of the CELL_PCH state, the URA_PCH state, or the Idle mode in UMTS.

27. An apparatus, comprising:
means for operating in a first state;
means for receiving a user-initiated search request to search for wireless networks while operating in the first state, wherein the first state is a CELL_PCH state or a URA_PCH state in Universal Mobile Telecommunication System (UMTS);
means for determining whether to perform a search for wireless networks in the first state but not a second state, in the second state but not the first state, or in both the first state and the second state, wherein the second state is a CELL_FACH state or a CELL_DCH state in UMTS;
means for transitioning from the first state to the second state; and means for performing the search for wireless networks in at least one of the first state or the second state based on the determination, wherein the means for performing the search comprises:
means for performing the search in the first state;
means for suspending the search in the second state if the transition to the second state is triggered by registration; and
means for canceling the search in the second state if the transition to the second state is not triggered by registration.

28. A method, comprising:
operating in a first state; receiving a request to search for wireless networks while operating in the first state; determining whether to perform a search for wireless networks in the first state but not a second state, in the second state but not the first state, or in both the first state and the second state; transitioning from the first state to the second state; and performing the search for wireless networks in at least one of the first state or the second state based on the determination, wherein performing the search comprises: performing the search in the first state and continuing the search in the second state if the first state is an idle state that comprises one or more of a CELL_PCH state, a URA_PCH state, or an Idle mode in Universal Mobile Telecommunication System (UMTS) and the second state is another idle state that comprises one or more of the CELL_PCH state, the URA_PCH state, or the Idle mode in UMTS; and canceling the search in the second state if the second state is an active state that comprises one or more of a CELL_DCH state or a CELL_FACH state in UMTS and the transition to the second state is not triggered by registration.

29. A method, comprising:
operating in a first state;
receiving a user-initiated search request to search for wireless networks while operating in the first state, wherein the first state is a CELL_PCH state or a URA_PCH state in Universal Mobile Telecommunication System (UMTS);
determining whether to perform a search for wireless networks in the first state but not a second state, in the second state but not the first state, or in both the first state and the second state, wherein the second state is a CELL_FACH state or a CELL_DCH state in UMTS;
transitioning from the first state to the second state; and
performing the search for wireless networks in at least one of the first state or the second state based on the determination, wherein performing the search comprises:
performing the search in the first state;
suspending the search in the second state if the transition to the second state is triggered by registration; and
canceling the search in the second state if the transition to the second state is not triggered by registration.

30. A tangible storage medium storing processor-executable software instructions configured to cause a processor to: operate in a first state; receive a request to search for wireless networks while operating in the first state; determine whether to perform a search for wireless networks in the first state but not a second state, in the second state but not the first state, or in both the first state and the second state; transition from the first state to the second state; and perform the search for wireless networks in at least one of the first state or the second state based on the determination, wherein performing the search comprises: performing the search in the first state and continuing the search in the second state if the first state is an idle state that comprises one or more of a CELL_PCH state, a URA_PCH state, or an Idle mode in Universal Mobile Telecommunication System (UMTS) and the second state is another idle state that comprises one or more of the CELL_PCH state, the URA_PCH state, or the Idle mode in UMTS and canceling the search in the second state if the second state is an active state that comprises one or more of a CELL_DCH state or a CELL_FACH state in UMTS and the transition to the second state is not triggered by registration.

31. A tangible storage medium storing processor-executable software instructions configured to cause a processor to:
operate in a first state;
receive a user-initiated search request to search for wireless networks while operating in the first state, wherein the first state is a CELL_PCH state or a URA_PCH state in Universal Mobile Telecommunication System (UMTS);
determine whether to perform a search for wireless networks in the first state but not a second state, in the second state but not the first state, or in both the first state and the second state, wherein the second state is a CELL_FACH state or a CELL_DCH state in UMTS;
transition from the first state to the second state; and
perform the search for wireless networks in at least one of the first state or the second state based on the determination, wherein performing the search comprises:
performing the search in the first state;
suspending the search in the second state if the transition to the second state is triggered by registration; and
canceling the search in the second state if the transition to the second state is not triggered by registration.

* * * * *